United States Patent [19]

Wasilewski et al.

[11] Patent Number: 5,372,635

[45] Date of Patent: Dec. 13, 1994

[54] PRINTING INK COMPOSITION

[75] Inventors: Olgierd Wasilewski, Edison; Richard R. Durand, Jr., Wood Ridge; Ramasamy Krishnan, Sewaren; Thi N. Do, West Orange, all of N.J.

[73] Assignee: Sun Chemical Corporation, Fort Lee, N.J.

[21] Appl. No.: 156,537

[22] Filed: Nov. 23, 1993

[51] Int. Cl.$^5$ ............................................. C09D 11/06
[52] U.S. Cl. ..................... 106/27 B; 106/27 A; 106/27 R; 106/28 R; 106/28 A
[58] Field of Search ................. 106/27 R, 27 A, 27 B, 106/28 R, 28 A

[56] References Cited

U.S. PATENT DOCUMENTS

| | | | |
|---|---|---|---|
| 2,090,704 | 8/1937 | Rowell | 134/35 |
| 3,819,386 | 6/1974 | Higgins et al. | 106/27 B |
| 4,045,232 | 8/1977 | Parkinson | 106/28 |
| 4,419,132 | 12/1983 | Moynihan | 106/27 R |
| 4,519,841 | 5/1985 | Moynihan | 106/27 R |
| 4,554,019 | 11/1985 | Moynihan | 106/27 R |
| 4,773,932 | 9/1988 | Gamblin | 106/28 A |
| 4,854,969 | 8/1989 | Bassemir et al. | 106/2 |
| 4,981,517 | 1/1991 | De Santo et al. | 106/28 |
| 5,158,606 | 10/1992 | Carlick | 524/145 |
| 5,198,024 | 3/1993 | Tuovinen et al. | 106/27 R |

FOREIGN PATENT DOCUMENTS 52-012604  4/1977  Japan.
60071675  9/1983  Japan.

*Primary Examiner*—Helene Klemanski
*Attorney, Agent, or Firm*—Jack Matalon

[57] ABSTRACT

A printing ink composition comprising:
(a) a dispersion of about 10–25 wt. %, based on the weight of the composition, of a pigment in about 40–90 wt. %, based on the weight of the composition, of a $C_7$–$C_{40}$ oil; and
(b) about 0.1 to 5.0 wt. %, based on the weight of the composition, of a soap of a tall oil fatty acid.

The printing ink composition has the unique capability of being utilized in lithographic printing processes utilizing tap water rather than aqueous fountain solution in the dampening system of the press.

10 Claims, No Drawings

PRINTING INK COMPOSITION

FIELD OF THE INVENTION

The present invention relates to a printing ink composition. More particularly, it relates to a printing ink composition which has the unique capability of being utilized in lithographic printing processes wherein the fountain solution consists of tap water.

BACKGROUND OF THE INVENTION

The printing ink compositions of the present invention are particularly suited for use in lithography. Lithography is a printing process that relies on a chemical distinction between image and non-image areas of the printing plate rather than any physical relief differentiation. Such plates are referred to as planographic since the image and non-image areas are in the same plane. The plates are constructed so that with proper treatment the image areas are hydrophobic and oleophilic and thereby receptive to inks. The non-image areas are hydrophilic and are water receptive.

With the exception of driographic, i.e. waterless, plates, all types of lithographic plates require a continuous supply of an aqueous fountain solution to activate and maintain the distinction between ink-accepting image areas and ink-repelling non-image areas.

As regards lithography, the distinction between image and non-image areas is sufficient to cause the following effects:
1) aqueous fountain solution spreads on the non-image area;
2) aqueous fountain solution in the image area is unable to form a continuous film, leaving the image free to accept ink.

In the absence of water, the image/non-image distinction is not, however, sufficient to stop printing ink, with its lower surface tension, from wetting both areas. Hence the need for an aqueous fountain solution in lithography to generate a barrier between the ink and non-image area.

The foregoing explanation of lithography is highly simplified since it is based on a static situation. In practice, however, the situation is complicated because ink and aqueous fountain solution are being continuously applied from roller systems to the printing plate.

The aqueous fountain solution is used to maintain the non-image areas of a lithographic printing plate non-receptive to ink. While an offset printing press is running, aqueous fountain solution is continuously applied to the printing plate just before the application of the printing ink, or as a water in ink emulsion. The aqueous fountain solution has an affinity for the non-image, hydrophilic areas of the plate and immediately wets these areas. A complete and uniform film of aqueous fountain solution prevents the subsequent application of ink from covering the plate in a non-image area. The aqueous fountain solution and ink on the plate are then both transferred to the blanket and then to the printing substrate and the process begins again.

Lithographic printing plates are developed to expose a hydrophilic metal surface in the non-image areas, while image areas are left with a hydrophobic surface. There are many aqueous fountain solutions which will wet and coat the exposed metal surface of the non-image area of the plate. Plain water may temporarily perform fairly well, although aqueous solutions of various electrolytes, surfactants and water soluble polymers are generally required for good continuous performance. These additives promote plate wetting and fountain solution uniformity, as well as controlling the interaction of the fountain solution with the ink and the substrate.

DETAILED DESCRIPTION OF THE INVENTION

Novel printing ink compositions have now been discovered which provide excellent lithographic printing results and long printing run lengths with the use of tap water as the aqueous fountain solution. Such printing ink formulation provides significant advantages to the printer. Not only is the printing process cheaper, but environmental problems pertaining to disposal of spent conventional aqueous fountain solutions are eliminated since the fountain solution consists of plain tap water. Moreover, the perennial problem of matching various inks to various aqueous fountain solutions has been overcome by means of the present invention.

It has also been found that the printing ink compositions of the present invention provide the printer with an unexpected benefit. In the case of lithographic printing with conventional printing inks, the print density falls off with increasing volumes of fountain solution. This presents the printer with a problem in continuously trying to provide a printed substrate having an acceptable print density while at the same time carrying out the printing process with a fountain solution volume sufficient to keep the printing plates and blankets clean, especially when printing on high linting stock. However, in the case of the printing ink compositions of the present invention, the print density does not fall off with increasing volumes of water or aqueous fountain solution within normal press operating conditions. This affords the printer with wide latitude to provide a product having an acceptable print density while at the same time permitting the use of high water volumes during the printing process, thereby keeping the printing blankets and plates clean, without any extraneous shutdowns to clean the blankets and plates.

The novel printing ink compositions of the present invention comprise:
(a) a dispersion of about 10–25 wt. %, preferably 13–22 wt. %, based on the weight of the composition, of a pigment in about 40–90 wt. %, preferably 50–80 wt. %, based on the weight of the composition, of a $C_7$–$C_{40}$ oil; and
(b) about 0.1–5.0 wt. %, preferably 0.4–4 wt. %, based on the weight of the composition, of a soap of a tall oil fatty acid.

Especially useful printing ink compositions are those in which the pigment comprises carbon black. In such case, the printing ink composition desirably contains about 3–7 wt. %, preferably 4–6 wt. %, based on the weight of the composition, of a carbon black wetting agent selected from the group consisting of asphaltum, pitches and bitumen. The soap of the tall oil fatty acid may be formed in situ by formulating the composition with separate amounts of ammonium hydroxide or an alkali metal hydroxide (e.g. NaOH, KOH, etc.) and one or more tall oil fatty acids. However, it is also possible to pre-form the soap and include a slight excess (e.g. 0.01 mole) of the alkali metal hydroxide to insure that no free tall oil fatty acid is present. The tall oil fatty acid will be a $C_{12}$–$C_{21}$ monocarboxylic or dicarboxylic acid or mixture of such acids. Preferably, the soap of the tall oil fatty acid comprises the potassium salts of a mixture of fatty acids comprising stearic, oleic, linoleic and conjugated linoleic acids.

It is also desirable to include about 3–8 wt. %, preferably 4–6 wt. %, based on the weight of the composition, of a $C_3$–$C_{10}$ polyol in the printing ink composition, e.g. glycerin, diethylene glycol, triethylene glycol, propylene glycol, dipropylene glycol, sorbitol, etc. Preferably the polyol is glycerin. If a polyol such as glycerin is used in the printing ink composition, it is preferred to have the polyol present in the reaction mixture comprising the ammonium or alkali metal hydroxide and the tall oil fatty acid when pre-forming the soap.

It is also preferred to include about 0.5–2 wt. %, preferably 1–1.5 wt. %, based on the weight of the printing ink composition, of a nonionic surfactants having an HLB of 11–20. Suitable nonionic surfactants include $C_{10}$–$C_{20}$ alkylphenol ethoxylates, $C_{10}$–$C_{20}$ polyoxythylene alkylaryl ethers, $C_{10}$–$C_{24}$ fatty alcohol ethoxylates, ethoxylates of alcohols derived from lanolin, ethoxylated monoglycerides, ethoxylated diglycerides, ethoxylated triglycerides, ethoxylated polyoxypropylene glycol and block copolymers of propylene oxide and ethylene oxide having a weight average molecular weight of 2,500–7,500. A particularly useful nonionic surfactant is octylphenoxy poly(ethyleneoxy)ethanol.

A wide range of pigments may be employed in the printing ink compositions of the present invention. Non-limiting examples of useful pigments include CI Pigment Yellows 12, 13 and 17; CI Pigment Reds 2, 4, 48.2, 53.1, 57:1 and 81; CI Pigment Oranges 13 and 34; CI Pigment Black 7, CI Pigment Blues 1, 15, 15.1 and 18; CI Pigment Violets 1, 3 and 23; CI Pigment Greens 1, 2 and 7; CI Pigment Whites 6 and 18 and the like. Moreover, conventional amounts of typical additives found in lithographic inks may also be included, e.g. organoclays, polyethylene wax, polytetrafluoroethylene wax, silicas, polyamides and aluminum chelates, low molecular weight hydrocarbon resins, etc.

The following examples shall serve to illustrate the benefits achieved by the present invention. Unless otherwise indicate, all parts are by weight.

EXAMPLE 1 - PREPARATION OF PRINTING INK COMPOSITION

A soap of tall oil fatty acid was prepared by mixing 80.25 parts glycerine with 16.05 parts tall oil fatty acid. The mixture was heated to 90° C. at which time 3.7 parts of potassium hydroxide flakes were slowly added to the mixture (the potassium hydroxide level represented 15 wt. % excess above the 1:1 stoichiometric mixture of acid and base). The temperature was maintained at 90° C., while mixing, for an additional 2 hours. The soap solution was then cooled to room temperature and used to prepare the ink composition as described below.

A black ink base was prepared by combining the following ingredients and shot-milling the mixture:

| Component | Wt. % |
|---|---|
| Carbon Black | 25.30 |
| Organoclay | 2.25 |
| Asphaltic Still Bottoms | 2.25 |
| Mineral Oil (200 SUS) | 70.20 |
| Total | 100.00 |

The ink base prepared as described above was then let down, using high speed mixing, to form the finished printing ink composition from the following components:

| Component | Wt. % |
|---|---|
| Ink Base prepared above | 77.0 |
| Mineral Oil (750 SUS) | 8.0 |
| Petrolatum | 4.0 |
| Soap Solution prepared above | 6.0 |
| Octylphenoxy poly(ethyleneoxy)ethanol | 1.0 |
| Mineral Oil (60 SUS) | 4.0 |
| Total | 100.0 |

The finished printing ink composition prepared as described above was evaluated in the laboratory using a Didde Business Forms Press with conventional lithographic plates. The ink was able to print acceptable copies without scumming or tinting in the background area when tap water was substituted for fountain solution in the dampening system. Conventional newspaper inks could not print cleanly on the same press under the same conditions using tap water. The conventional newspaper inks required fountain solution in the dampening system in order to print cleanly.

EXAMPLE 2 - FIELD TRIAL OF INK OF EXAMPLE 1

The printing ink composition of Example 1 was trialed at a major newspaper printing plant using a conventional lithographic printing press and conventional lithographic printing plates. Four pages were run on one side of a single press unit which had been modified to provide tap water to the dampening system rather than the fountain solution used on all of the other press units.

The printing ink composition of Example 1 was run in excess of 120,000 copies without problems. Printing speeds of about 55,000 impressions per hour were achieved without any noticeable adverse impact on ink performance.

EXAMPLE 3 - FIELD TRIAL OF HEATSET VERSION

A heatset version of the printing ink compositions of the present invention was prepared by high speed mixing of the following components:

| Component | Wt. % |
|---|---|
| Hydrocarbon Varnish[a] | 41.6 |
| Modified Hydrocarbon Varnish[b] | 6.4 |
| Talc | 2.5 |
| Carbon Black | 21.1 |
| Solvent Oil[c] | 20.5 |
| Polytetrafluoroethylene Wax | 0.9 |
| Soap Solution of Example 1 | 6.0 |
| Octylphenoxy poly(ethyleneoxy)ethanol | 1.0 |
| Total | 100.0 |

[a] varnish consisting of Gilsonite resin in Magie 470 oil.
[b] a varnish consisting of maleic anhydride-modified hydrocarbon in Magie 470 oil.
[c] an oil consisting of Magie 470 oil.

The heatset printing ink composition was run at a commercial printing plant using tap water instead of fountain solution. A conventional heatset lithographic printing press and conventional lithographic printing plates were utilized in this trial. It was found that 30,000 impressions of acceptable print quality could be made using tap water in place of fountain solution without any print problems.

What is claimed is:

1. A printing ink composition comprising:
   (a) a dispersion of about 10-25 wt. %, based on the weight of the composition, of a pigment in about 40-90 wt. %, based on the weight of the composition, of a $C_7$-$C_{40}$ oil; and
   (b) about 0.1-5.0 wt. %, based on the weight of the composition, of a soap of a tall oil fatty acid.

2. The printing ink composition of claim 1 wherein the pigment comprises carbon black.

3. The printing ink composition of claim 2 including about 3-7 wt. %, based on the weight of the composition, of a carbon black wetting agent selected from the group consisting of asphaltum, pitches and bitumen.

4. The printing ink composition of claim 1 wherein the soap comprises an ammonium hydroxide or alkali metal hydroxide of a $C_{12}$-$C_{21}$ monocarboxylic acid, dicarboxylic acid or mixture of such acids.

5. The printing ink composition of claim 4 wherein the soap comprises the potassium salts of a mixture of fatty acids comprising stearic, oleic, linoleic and conjugated linoleic acids.

6. The printing ink composition of claim 1 including a $C_3$-$C_{10}$ polyol present in an amount of about 3-8 wt. %, based on the weight of the composition.

7. The printing ink composition of claim 6 wherein the polyol comprises glycerin.

8. The printing ink composition of claim 1 including a nonionic surfactant having an HLB of 11-20, present in an amount of about 0.5-2 wt. %, based on the weight of the composition.

9. The printing ink composition of claim 8 wherein the nonionic surfactant is selected from the group consisting of $C_{10}$-$C_{20}$ alkylphenol ethoxylates, $C_{10}$-$C_{20}$ polyoxythylene alkylaryl ethers, $C_{10}$-$C_{24}$ fatty alcohol ethoxylates, ethoxylates of alcohols derived from lanolin, ethoxylated monoglycerides, ethoxylated diglycerides, ethoxylated triglycerides, ethoxylated polyoxypropylene glycol and block copolymers of propylene oxide and ethylene oxide having a weight average molecular weight of 2,500-7,500.

10. The printing ink composition of claim 8 wherein the nonionic surfactant comprises octylphenoxy poly(ethyleneoxy)ethanol.

* * * * *